(12) United States Patent
Hintermeister et al.

(10) Patent No.: US 9,805,511 B2
(45) Date of Patent: Oct. 31, 2017

(54) INTERACTING WITH DATA FIELDS ON A PAGE USING AUGMENTED REALITY

(71) Applicant: International Business Machines Corporation, Armonk, NY (US)

(72) Inventors: Gregory R. Hintermeister, Rochester, MN (US); Jacob A. Kugel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/919,088

(22) Filed: Oct. 21, 2015

(65) Prior Publication Data

US 2017/0116784 A1    Apr. 27, 2017

(51) Int. Cl.
| | | |
|---|---|---|
| *G09G 5/00* | (2006.01) | |
| *G06T 19/00* | (2011.01) | |
| *G06F 3/0481* | (2013.01) | |
| *G06K 9/00* | (2006.01) | |
| *G06K 9/18* | (2006.01) | |

(52) U.S. Cl.
CPC .......... *G06T 19/006* (2013.01); *G06F 3/0481* (2013.01); *G06K 9/00442* (2013.01); *G06K 9/00671* (2013.01); *G06K 9/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,223,088 | B1* | 7/2012 | Gomez | G02B 27/017 345/7 |
| 9,058,331 | B2* | 6/2015 | Graham | H04L 51/32 |
| 2004/0181749 | A1* | 9/2004 | Chellapilla | G06F 17/243 715/222 |
| 2005/0198563 | A1* | 9/2005 | Kristjansson | G06F 17/243 715/224 |
| 2006/0029296 | A1* | 2/2006 | King | H04N 1/00244 382/313 |
| 2006/0098899 | A1* | 5/2006 | King | G06F 17/30011 382/305 |

(Continued)

FOREIGN PATENT DOCUMENTS

WO    2014085768 A1    6/2014

OTHER PUBLICATIONS

Sainsbury, Ben, QR Codes vs Augmented Reality Markers—a primer, Mar. 22, 2012, 11 pgs.

*Primary Examiner* — M Good Johnson
(74) *Attorney, Agent, or Firm* — William H. Hartwell; Hunter E. Webb; Keohane & D'Alessandro PLLC

(57) ABSTRACT

Embodiments described herein provide approaches for interacting with data fields on a page using an augmented reality (AR) device. Specifically, a way for a user to interact with a page having preprinted content and a user's handwritten content within a real world scene using a display screen of the AR device is provided. An image capture unit of the AR device captures image data representing the page. A processing unit performs a page scan of the captured image data to determine a set of data fields located on the page. Context data for at least one data field within the page is received by the processing unit. Augmented reality content based on the context data is incorporated into the page when viewing the page through the display screen.

20 Claims, 7 Drawing Sheets

(56) References Cited

U.S. PATENT DOCUMENTS

| | | | |
|---|---|---|---|
| 2006/0285772 A1* | 12/2006 | Hull | G06F 17/30247 382/305 |
| 2007/0036433 A1* | 2/2007 | Teutsch | G06K 9/00449 382/173 |
| 2007/0046982 A1* | 3/2007 | Hull | G06K 9/00442 358/1.15 |
| 2007/0136283 A1* | 6/2007 | Silverbrook | G06F 17/30637 |
| 2008/0059308 A1* | 3/2008 | Gerken | G06Q 30/02 705/14.44 |
| 2011/0018903 A1* | 1/2011 | Lapstun | G02B 26/06 345/633 |
| 2011/0164163 A1* | 7/2011 | Bilbrey | G06F 1/1694 348/333.01 |
| 2013/0110775 A1* | 5/2013 | Forsythe | G06F 17/30943 707/613 |
| 2013/0147836 A1* | 6/2013 | Small | G06F 3/011 345/633 |
| 2013/0201185 A1* | 8/2013 | Kochi | G06F 3/011 345/419 |
| 2013/0222381 A1 | 8/2013 | Dei Censo et al. | |
| 2013/0226758 A1* | 8/2013 | Reitan | G06Q 40/00 705/35 |
| 2013/0293530 A1* | 11/2013 | Perez | G06T 19/006 345/418 |
| 2014/0029046 A1 | 1/2014 | Ponnavaikko et al. | |
| 2014/0123057 A1* | 5/2014 | Eigner | H04L 67/30 715/780 |
| 2014/0152869 A1* | 6/2014 | Solotko | G06Q 10/10 348/231.3 |
| 2014/0168716 A1* | 6/2014 | King | G06K 9/228 358/473 |
| 2014/0171039 A1* | 6/2014 | Bjontegard | H04L 29/06034 455/414.1 |
| 2014/0188756 A1* | 7/2014 | Ponnavaikko | G06K 9/00449 705/342 |
| 2014/0247278 A1* | 9/2014 | Samara | G06K 17/0016 345/633 |
| 2014/0365484 A1* | 12/2014 | Freeman | G06Q 50/01 707/736 |
| 2015/0123966 A1* | 5/2015 | Newman | G06T 19/006 345/419 |
| 2015/0200922 A1* | 7/2015 | Eschbach | H04L 63/08 358/1.14 |
| 2015/0244892 A1* | 8/2015 | Arputharaj | H04N 1/04 358/473 |
| 2015/0317569 A1* | 11/2015 | Renaudie | G06Q 10/02 705/5 |
| 2016/0350595 A1* | 12/2016 | Solomin | G06K 9/00671 |
| 2017/0039178 A1* | 2/2017 | Eschbach | G06F 17/243 |

* cited by examiner

INTERACTING WITH DATA FIELDS ON A PAGE USING AUGMENTED REALITY

TECHNICAL FIELD

This invention relates generally to augmented reality and, more specifically, to interacting with data fields on a page using an augmented reality device.

BACKGROUND

Augmented reality (AR) is a live view of a physical, real-world environment whose elements are augmented (or supplemented) by computer-generated sensory input such as sound, video, graphics or GPS data. AR systems can merge computer synthesized objects with the user's space in the real world. In an AR system, computer generated graphics often enhance the user's interaction with, or perception of, the real world.

Business services, such as banking, play a significant role in the day-to-day life of many individuals. Prior to accessing these services, customers typically provide information using one or more application forms, which may vary from service-to-service. For example, if a customer wishes to open a new bank account, the customer provides information on an account application form. Similarly, a customer may complete a loan application form when applying for a loan. Manually processing these application forms may incur a significant cost, both in terms of time and resources.

Augmented reality systems have been used to interact with written or printed text on a page and for adding digital content through a screen. To that end, augmented reality has been leveraged for automatically processing of forms to make the application process more efficient and less costly.

U.S. Patent Application 2014/0188756 discloses a feature of providing a mechanism to allow augmented-reality (AR) system to interact with written/printed text on a page, for adding digital content through a screen is disclosed. The feature of optically scanning text content that is printed on a page and identifying one or more fields and receiving user input through the one or more fields as data input for submitting the physical content in digital form is disclosed as, "The present disclosure discloses a method for automatic processing of forms using augmented reality. In an embodiment, a filled-out application form including one or more fields is scanned in augmented reality mode and its one or more images are captured. The captured images are used to identify the form type by comparing them with an original application form and to generate an electronic version of the form. Subsequently, filled-out content in the images is extracted and compared with a retrieved configuration file, which has a type same as the identified type of the filled-out application form. Based on this comparison, one or more messages are generated that are superimposed on the electronic version of the form in the augmented reality mode and that both are displayed."

U.S. Patent Application 2014/0029046 discloses a method of scanning an application form and automatically identifying the completeness and correctness of the application form and allowing user to input data into the fields identified in the scanned application form is disclosed as, "The present disclosure discloses a system for automatically checking completeness and correctness of application forms and that system includes a device, and a user interface. The device is configured to receive a filled out application form for scanning, and identify a type of application form corresponding to the scanned form; the application form includes various fields. The device is configured to retrieve a configuration file corresponding to the form type, the configuration file including threshold values and rules."

However, a need exists for a way for a user to interact with a printed page containing a quick response (QR) code by writing, filling in physical fields, or adding digital content through a screen that will affect the information retrieved from a network.

SUMMARY

In general, embodiments described herein provide approaches for interacting with data fields on a page using an augmented reality (AR) device. Specifically, a way for a user to interact with a page having preprinted content and a user's written content within a real world scene using a display screen of the AR device is provided. An image capture unit of the AR device captures image data representing the page. A processing unit (or processor) performs a page scan of the captured image data to determine a set of data fields located on the page. Context data for at least one data field within the page is received by the processing unit. Augmented reality content based on the context data is incorporated into the page when viewing the page through the display screen.

One aspect of the present invention includes a computer-implemented method for interacting with a page within a real world scene. The method comprises receiving image data representing the page within the real world scene from an image capture unit; performing a page scan of the captured image data representing the page; determining a set of data fields located on the page based on the page scan; receiving context information for at least one data field among the set of data fields located on the page; and incorporating augmented reality content into the page while viewing the page through a display screen, wherein the augmented reality content is based on the context information. This method offers several advantages, such as, but not limited to, providing contextual awareness and processing logic for scanned fields on a page.

The method may optionally further comprise performing an interaction scan to determine a user interaction with the at least one data field among the set of data fields. These techniques enable, for example, the ability for a user to interact with a data field located on a page.

The method may optionally further comprise receiving a processing rule for the at least one data field among the set of data fields. This offers, for example, an advantage of providing a rule which determines how a user may interact with a data field located on a page.

The method may optionally further comprise incorporating page-level augmented reality content, wherein the page-level augmented reality content includes at least one selectable button. These techniques enable, for example, the ability to include a set of user-selectable buttons on a page.

The method may optionally further comprise incorporating feedback augmented reality content into the page while viewing the page through the display screen. The additional augmented reality content may be based on a user interaction, a processing rule, a data field or fields, or a selection of a button or buttons. This offers, for example, an advantage of providing feedback augmented reality content based on a user's interaction with the page.

Another aspect of the present invention includes a computer system for interacting with a page within a real world scene, the computer system comprising: a memory medium comprising program instructions; a bus coupled to the memory medium; and a processor for executing the program instructions, the instructions causing the system to: receive image data representing the page within the real world scene from an image capture unit; perform a page scan of the captured image data representing the page; determine a set of data fields located on the page based on the page scan; receive context information for at least one data field among the set of data fields located on the page; and incorporate augmented reality content into the page while viewing the page through a display screen, wherein the augmented reality content is based on the context information.

Yet another aspect of the present invention includes a computer program product for interacting with a page within a real world scene, the computer program product comprising a computer readable storage device, and program instructions stored on the computer readable storage device, to: receive image data representing the page within the real world scene from an image capture unit; perform a page scan of the captured image data representing the page; determine a set of data fields located on the page based on the page scan; receive context information for at least one data field among the set of data fields located on the page; and incorporate augmented reality content into the page while viewing the page through a display screen, wherein the augmented reality content is based on the context information.

Yet still another aspect of the present invention includes a method for interacting with a page within a real world scene, comprising: capturing image data representing the page within the real world scene; performing a page scan of the captured image data representing the page; determining a set of data fields located on the page based on the page scan; receiving context information for at least one data field among the set of data fields located on the page; and incorporating augmented reality content into the page while viewing the page through a display screen, wherein the augmented reality content is based on the context information.

BRIEF DESCRIPTION OF THE DRAWINGS

These and other features of this invention will be more readily understood from the following detailed description of the various aspects of the invention taken in conjunction with the accompanying drawings in which.

Figure 1B:
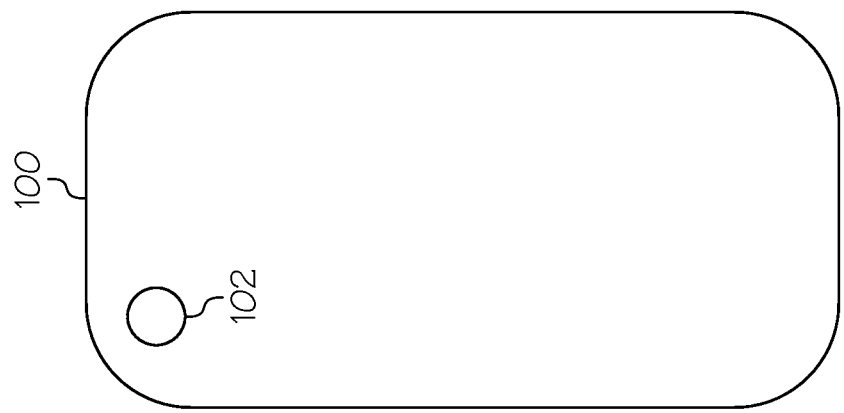
FIGS. 1A-B show an example augmented reality device 100 for interacting with data fields on a page according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As used herein, the term "page" can be any document, book, publication, magazine, reading material, literature, brochure, memo, note, journal, newspaper, card, postcard, sign, poster, billboard, and all types of other printed matter supported by a medium (i.e., paper, cardboard, plastic, film, metal, glass, ceramic, or displayed on a screen, such as a liquid crystal display (LCD), a plasma display panel (PDP), an electroluminescent display (ELD), a vacuum fluorescent display (VFD), a flat-panel cathode ray tube (CRT) display, a light-emitting diode (LED) display, or the like). A page may contain any number of data fields. The term "data field" in this context may include any single or group of symbols or characters, whether handwritten or printed. It is understood that symbols and/or characters may include without limitation letters of the alphabet, numbers, punctuation, pictograms, icons, and the like.

Unlike virtual reality (VR) which replaces the real world with a simulated one, augmented reality (AR) typically includes the real-time overlay of virtual data, images, and videos onto live video feeds. For AR, the base layer is typically real and may include, for example, a live video feed or, in the case of head-mounted displays, a user's own vision. According to examples provided below, an AR system and a method for interacting with data fields on a page are disclosed herein, and may generally provide for implementation of AR in a variety of fields. The advantages of the disclosed system and method have applications such as in the retail context where retailers may desire to offer goods or services to users and/or customers by providing an interactive promotional or sales offer. These advantages may also be applicable in entertainment and social media areas.

As stated above, embodiments described herein provide approaches for interacting with data fields on a page using an augmented reality (AR) device. Specifically, a way for a user to interact with a page having preprinted content and a user's written content within a real world scene using a display screen of the AR device is provided. An image capture unit of the AR device captures image data representing the page. A processing unit performs a page scan of the captured image data to determine a set of data fields located on the page. Context data for at least one data field within the page is received by the processing unit. Augmented reality content based on the context data is incorporated into the page when viewing the page through the display screen.

The approaches described herein contain numerous advantages over present methods including, but not limited to, providing contextual awareness and processing logic for optical character recognition (OCR) fields located on a page. Approaches further include highlighting user text areas and allowing one or more fields to be "locked" to prevent additional OCR scans of those fields. Since OCR does not always recognize characters with 100% accuracy, this approach provides a way for the user to trigger a rescan without rescanning successfully scanned fields. Furthermore, the approaches described herein provide for event-driven processing and script language for processing changes in a user's written text, numbers, checkboxes, etc. In addition, approaches further include for identifying a field for electronic scanning to auto fill content located on the page. Furthermore, the approaches provide for polling a social media site to assist a user in making a selection related to a data field on the page.

Figure 1A:
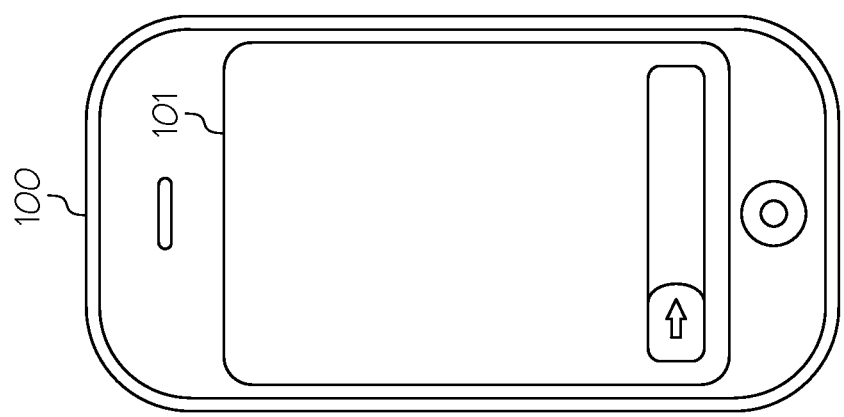

As shown in FIGS. 1A-B, in one embodiment, an AR device with a display, a camera, and software configured to execute the functionality described below is provided. One exemplary illustration of the AR device is smartphone 100 having display screen 101 and an image capture unit, such as camera 102. In another embodiment, the AR device may include, but is not limited to, a wireless subscriber unit, user equipment (UE), mobile station, pager, mobile computer, cellular telephone, telephone, personal digital assistant (PDA), computing device, surface computer, tablet computer, appliance, automobile computer system, vehicle computer system, part of a windshield computer system, television device, home appliance, home computer system, laptop, netbook, tablet computer, personal computer (PC), an Internet pad, digital music player, media player, video game device, head-mounted display (HMD), helmet mounted display (HMD), glasses, goggles, or other suitable electronic device.

Figure 2:
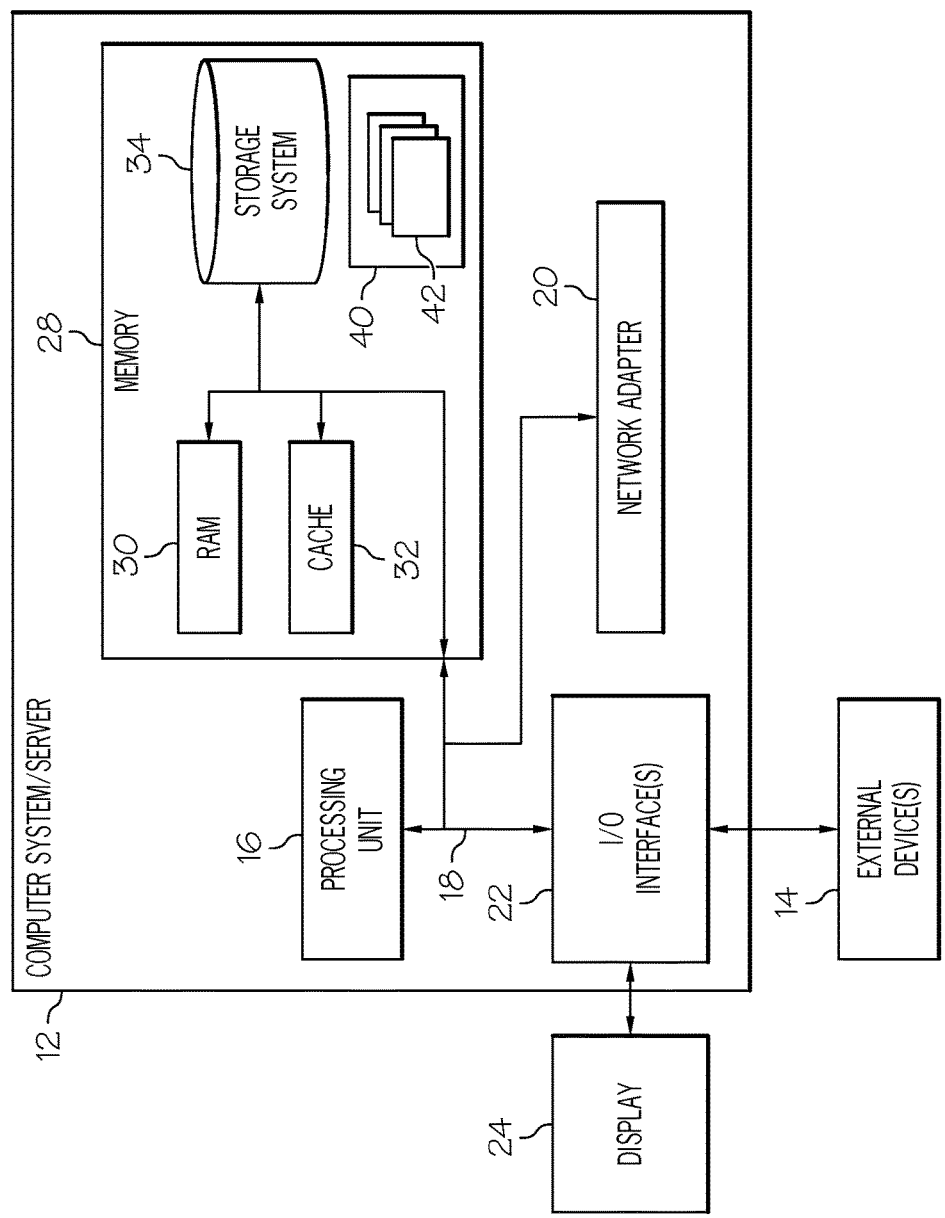
FIG. 2 shows a block diagram that illustrates a computer implementation 10 in which the invention may be implemented according to illustrative embodiments.

FIG. 2 is a block diagram that illustrates a computer implementation 10 for interacting with data fields on a page via augmented reality content, such as that shown in FIG. 1, according to an embodiment of the present invention. The preferred embodiment is implemented using one or more computer programs running on an AR device, such as smartphone 100. Thus, in this embodiment, the computer implementation 10 is smartphone 100.

Referring now to FIG. 2, a computerized implementation 10 of an embodiment for interacting with data fields on a page via augmented reality content will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and/or distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, and/or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and/or the like, that perform particular tasks or implement particular abstract data types. In this particular example, computer system 12 represents an illustrative system interacting with data fields on a page via augmented reality content. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as interacting with data fields on a page using augmented reality content, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a consumer to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc.

The approaches described herein contain numerous advantages over present methods including, but not limited to, providing contextual awareness and processing logic related to preprinted data fields scanned using character recognition technology, such as optical character recognition (OCR), from a page. While existing art enables a user to convert different types of documents, such as scanned paper documents, portable document files (PDFs) or images captured by a digital camera into editable and searchable data, embodiments of the present invention determine context information of the data fields on a page and how to process the data fields along with a user's written content on the page. For example, an image capture unit (e.g., a camera 102) of an AR device may scan a page using character recognition technology to reveal a set of checkboxes printed on the page. Augmented reality content may be displayed on a display screen (e.g., display screen 102) of the AR device (e.g., smartphone 100) indicating to the user to check only one checkbox. If no checkboxes are checked or the user checks more than one checkbox, an exception message may be displayed on the display screen to the user as augmented reality content indicating the issue.

Furthermore, embodiments of the present invention provide the ability for "locking" data fields on a page. For example, a user may highlight one or more data fields to prevent subsequent character recognition scans of the data field(s) after an initial scan. Since a character recognition scan does not always recognize characters with complete accuracy, embodiments of the present invention provide a way for the user to trigger a rescan without rescanning already successfully scanned data fields. The lock feature allows the user to save the last character recognition scan for a particular data field that is correct, so that a subsequent character recognition scan will not modify it. In addition, the locking feature can be used as an "ignore" option on a character recognition scan for scribbles or other artifacts on the page so that the character recognition scan does not capture non-essential Items.

Embodiments of the present invention further provide the ability to capture scanning layers using the locking feature discussed above. For example, a user could scan a page and subsequently lock all the scanned data fields located on the page. In this case, layer 1 would contain only the data fields from the page in its original form. The user can then write text onto the page and then rescan the page. Layer 2 would contain only the altered content on the page (i.e., the user's written content). The user's written content (or user interaction with the page) may include, but is not limited to, adding text (e.g., words, letters, numbers, symbols, etc.), filling in a shape (e.g., oval, circle, etc.), checking a checkbox, or the like. The ability to capture scanning layers can be useful when isolating the user's written content from the printed data fields of the page in its original state. In some embodiments, the present invention can provide event-driven processing related to a user's written content and/or a data field. For example, a page may allow a user to select a prize from among a set of five prizes by filling in a corresponding oval next to the desired prize. Based on the user selection, the present invention may provide additional processing such as verifying that the selected prize is currently in stock, providing a list of others that have selected that particular prize, etc.

Also, embodiments of the present invention provide the ability to identify a data field which may be auto filled with a separate application. For example, if a data field of a physical paper requires a barcode from a cereal box, the user can select (e.g., by tapping with a finger) the data field which may provide options on how to fill in the data field. In one embodiment, available applications which may be used to fill the data field may be provided to the user (e.g., barcode reader application, photo application, etc.). In the above example, a barcode reader application may be provided to the user and used to scan the barcode on a cereal box. The output from the barcode reader application (i.e., the decoded numbers) may be used to auto fill the data field of the physical paper.

Embodiments of the present invention also provide a polling option with the ability to poll social media sites with time-based polling from a network of others (e.g., friends, coworkers, etc.) to assist a user with interaction with a page. Using the prize scenario above, a user may need to select from among five prizes. The user may select the polling option which will then allow the user to configure the poll by selecting a social media site to use for polling, duration of the poll, etc. The results of the poll will be gathered, and the most popular option can be used to select a prize. In some embodiments, the user can alter the selection if he/she disagrees with the results. The present invention will further be explained with reference to the following drawings.

Figure 3:
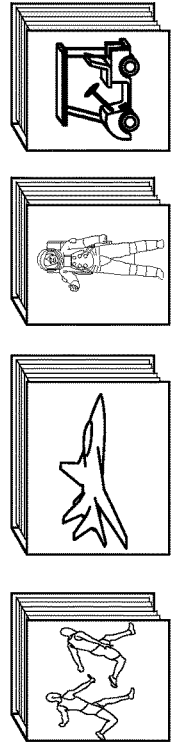
FIG. 3 shows an example page 300 having data fields according to illustrative embodiments.
Figure 3:
Figure 3:
Figure 3:
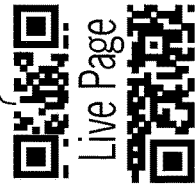

FIG. 3 shows a promotional offer postcard 300 having a page code 302 (i.e., a quick response or "QR" code) that can be used to receive a free book. Page code 302 may be used for storing a uniform resource identifier (URL) or other information for reading by a camera, such as camera 102 on smartphone 100. As shown, promotional offer postcard 300 indicates it can be viewed by a user with an augmented reality application. For illustrative purposes only, the augmented reality application in this example is called "Live Page". As previously discussed, embodiments of the present invention provide an ability to dynamically locate and read data fields on a page. In one example, OCR technology is used to scan the page. For example, the promotional offer postcard 300 allows a user to receive a free book by completing three steps. In step 1, the user selects one of four books to receive by filling in a corresponding oval below the user's book selection. In step 2, the user must also fill in three codes from cereal boxes. In step 3, the user can mail in the promotional offer postcard 300 or view the card using the "Live Page" application to submit electronically.

Upon scanning the page, a contextual awareness and processing logic for the scanned data fields scanned may be provided. In one example, the viewed page and data fields may be compared to a plurality of pages and data fields stored in a database including information associated with the pages and data fields. The page and data fields viewed by the user may be identified based on the match of the viewed page and data fields and the stored pages and data fields. The database may contain a context information data and processing logic for the viewed the page and/or data fields. The context information data and/or processing logic may be used when generating/incorporating augmented reality content into the displayed page.

Figure 4:
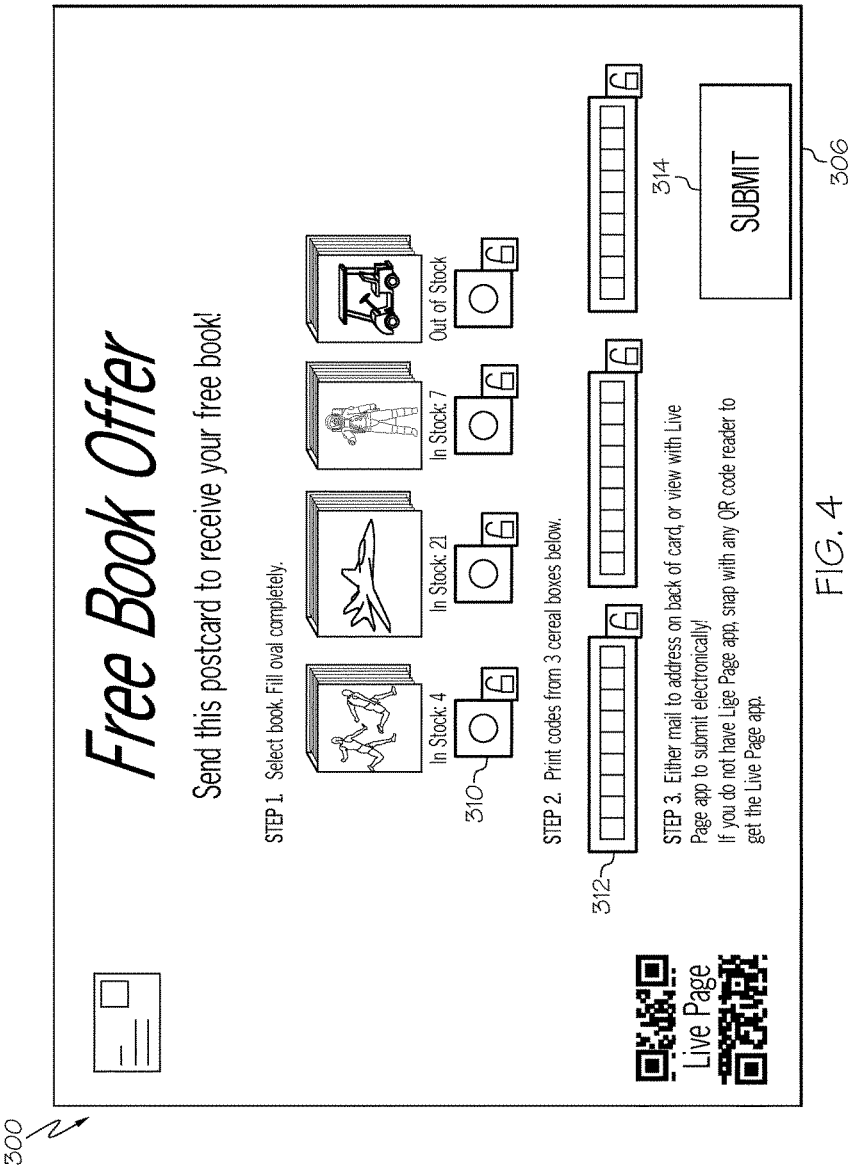
FIG. 4 shows an example page 300 having data fields including augmented reality content according to illustrative embodiments.

FIG. 4 shows the promotional offer postcard 300 including augmented reality content. Embodiments of the present invention provide augmented reality content to a user when the user views the postcard through a display screen of an AR device such as smartphone 100. Using the example depicted in FIG. 3, the following preprinted data fields are located on promotional offer postcard 300: a set of four ovals 310 and three text box strips 312. Context information in the form of augmented reality content is provided for the data fields. Context information may include a description or set of instructions and/or include any suitable indicator, such as an outlining, underlining, highlighting, color variation, shading, symbol(s), or the like. As shown, each of the data fields is outlined indicating the data fields on the page which a user may interact with. Also, an augmented reality mechanism to lock data fields is shown next to each of the book selection ovals. Context information may be used to assist a user in locating interactive data fields while also assisting the user with methods for interaction. As shown, the user is directed to fill in one oval among the set of four ovals 310 representing a book selection while also providing cereal box codes in the three text box strips 312. Further, the number of available copies for each book is displayed.

Further, processing logic may dictate that only one oval may be filled in by the user (i.e., only one book may be selected). Additionally, context information is displayed indicating to a user to provide box codes for the text box strips. Processing rules may specify that a distinct print code from each of three cereal boxes must be provided prior to submitting the page for further processing. After filling out promotional offer postcard 300 but prior to submitting it, the user can view the postcard using camera 102 of smartphone 100. At this point, an "interaction" scan may be performed and feedback information based on any markings made by the user (e.g., checking a checkbox, filling in an oval, entering a code, writing text, etc.) may be displayed as additional augmented reality content. For example, if the user neglects to properly fill out a required data field needed for final submission, a warning message may be displayed on display screen 101 alerting the user to the issue.

In some embodiments, page-level augmented reality content, such as one or more buttons, may be presented on display screen 101 which can launch additional functionality. In one example, such additional functionality may be performed using JavaScript-like event handlers. To that end, button selection (e.g., lock buttons, "Submit" button, etc.)

can be accomplished with a touch screen if viewing using a device such as a tablet or smartphone or using a pointing instrument (e.g., a pen) to point at the desired button. When the pointing is detected, the button may change color indicating it is being targeted for selection. If the user continues to point at the button for a predefined amount of time (e.g., 3 seconds), the pointing will be interpreted as a selection of the button (e.g., submit). As shown, a submit button 314 is displayed which the user may activate when ready to submit the postcard upon fully and properly filling out the page.

Figure 5:
FIG. 5 shows an example entertainment game 600 having data fields according to illustrative embodiments.
Figure 5:

FIG. 5 shows an example entertainment game 600 according to illustrative embodiments. As shown, entertainment game 600 is a Sudoku puzzle. As earlier, the page includes a page code (e.g., a QR code or barcode) and wording indicating the page can be viewed by a user with an augmented reality application (e.g., "Live Page"). In one example, information including augmented reality content associated with the viewed page and data fields may be retrieved from a database. In some embodiments, instructions including a URL and/or program code for retrieving the information may be retrieved from the page code (e.g., QR code). Also, information on how to handle a page submission (i.e., user selects "Submit" button) may also be retrieved from the database or contained within the page code.

Figure 6:
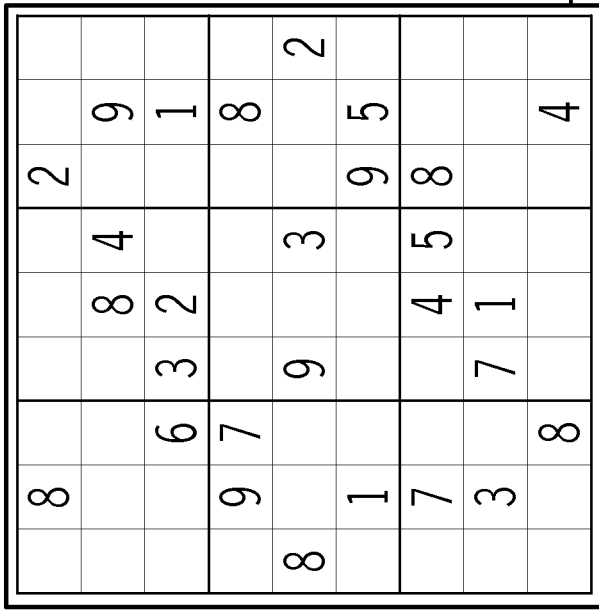
FIG. 6 shows an example entertainment game 600 having data fields including augmented reality content according to illustrative embodiments.

FIG. 6 shows the Sudoku puzzle with augmented reality content when being viewed using "Live Page". The augmented reality content includes a lock option 602 to lock the user's interactions (e.g., markings, writings, etc.) with the puzzle. Also, page-level augmented reality content in the form of a "Check Validity" button 604, a "See Hint" button 606, and a "Submit" button 608 are displayed on display screen 101 when viewing the puzzle. One or more buttons may provide feedback information when selected based on any user's interactions with the puzzle. When a button is selected, a second character recognition scan (or interaction scan) is performed to determine the user's additions to the page. For example, the user may begin filling out the puzzle and check his progress by selecting "Check Validity" button 604. Any cells with an incorrect value may be marked using augmented reality content (such as displaying a red line or highlighting). If the user becomes stuck while playing the game, the user may select "See Hint" button 606. A hint may then be displayed to the user. When the user finishes the puzzle, he may select "Submit" button 608 for a chance to win a prize after locking and scanning the finished puzzle. When the user submits the finished puzzle, the finished puzzle may be transmitted to the game provider for further processing.

Figure 7:
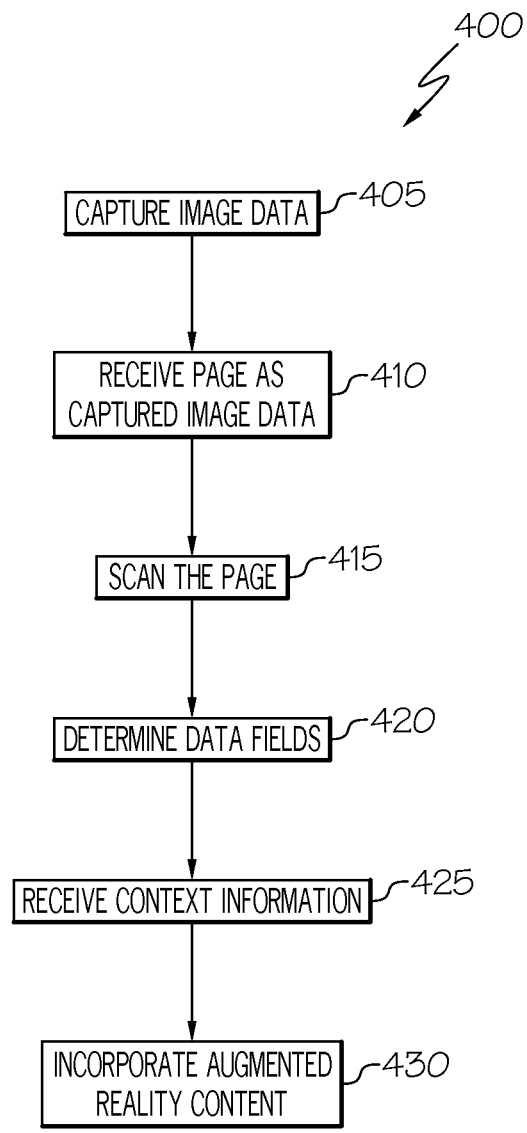
FIG. 7 shows a process flowchart 700 for interacting with data fields on a page according to illustrative embodiments.

Referring now to FIG. 7, in conjunction with FIGS. 1 and 2, an implementation of a process 400 for interacting with data fields on a page using an augmented reality device according to illustrative embodiments is shown. At step 405, image data representing a page is captured by an image capture unit of an AR device when a user views the page through a display screen of the AR device. At step 410, a processing unit of the AR device receives the captured image data representing the page. At step 415, the processing unit scans the page. At step 420, a set of data fields located on the page are determined based on the scan. At step 425, context information for at least one data field located on the page from among the set of data fields is received. At step 430, augmented reality content is incorporated into the page as the user views the page through the display screen. The augmented reality content is based on the received context information.

Process flowchart 400 of FIG. 7 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for preventing an accidental termination of the phone call session during a conversation. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for preventing an accidental termination of the phone call session during a conversation. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (i.e., the Internet, a local area network, a wide area network and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches to preventing an accidental termination of the phone call session during a conversation. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for interacting with a page within a real world scene, comprising:
    receiving image data representing the page within the real world scene at an augmented reality device from an image capture unit, the image capture unit capturing the image data in a continuous capture mode in real time;
    performing a page scan of the captured image data representing the page;
    determining a set of data fields located on the page based on the page scan;
    locking an area of the scanned data designated by the user;
    performing a subsequent page scan, the subsequent page scan scanning only areas of the page that are not locked;
    receiving context information for at least one data field among the set of data fields located on the page at the augmented reality device, the context information transforming the at least one data field into a control that the user can interact with; and
    incorporating augmented reality content into the page while viewing the page through a display screen of the augmented reality device in the continuous capture mode, wherein the augmented reality content is based on the context information.

2. The method of claim 1, further comprising performing an interaction scan to determine a user interaction with the at least one data field among the set of data fields.

3. The method of claim 2, further comprising receiving a processing rule for the at least one data field among the set of data fields.

4. The method of claim 3, further comprising incorporating page-level augmented reality content, wherein the page-level augmented reality content includes at least one selectable button.

5. The method of claim 4, further comprising incorporating feedback augmented reality content into the page while viewing the page through the display screen, wherein the additional augmented reality content is based on at least one of the user interaction, the processing rule, the at least one data field among the set of data fields, or a selection of the at least one selectable button.

6. The method of claim 1, further comprising locking the at least one data field among the set of data fields so that the at least one data field is not scanned on a subsequent scan.

7. The method of claim 1, further comprising:
    polling a social media site related to the at least one data field among the set of data fields to provide a user interaction with the at least one data field, and
    including a result of the polling in the augmented reality content on the display screen.

8. A computer system for interacting with a page within a real world scene, the computer system comprising:
    a memory medium comprising program instructions;
    a bus coupled to the memory medium; and
    a processor for executing the program instructions, the instructions causing the system to:
        receive image data representing the page within the real world scene at an augmented reality device from an image capture unit, the image capture unit capturing the image data in a continuous capture mode in real time;
        perform a page scan of the captured image data representing the page;
        lock an area of the scanned data designated by the user;
        perform a subsequent page scan, the subsequent page scan scanning only areas of the page that are not locked;
        determine a set of data fields located on the page based on the page scan;
        receive context information for at least one data field among the set of data fields located on the page at the augmented reality device, the context information transforming the at least one data field into a control that the user can interact with; and
        incorporate augmented reality content into the page while viewing the page through a display screen of the augmented reality device in the continuous capture mode, wherein the augmented reality content is based on the context information.

9. The computer system of claim 8, further comprising program instructions to cause the system to perform an interaction scan to determine a user interaction with the at least one data field among the set of data fields.

10. The computer system of claim 9, further comprising program instructions to receive a processing rule for the at least one data field among the set of data fields.

11. The computer system of claim 10, further comprising program instructions to incorporate page-level augmented reality content while viewing the page through the display screen, wherein the page-level augmented reality content includes at least one selectable button.

12. The computer system of claim 11, further comprising program instructions to incorporate feedback augmented reality content into the page while viewing the page through the display screen, wherein the additional augmented reality content is based on at least one of the user interaction, the processing rule, the at least one data field among the set of data fields, or a selection of the at least one selectable button.

13. The computer system of claim 8, further comprising program instructions to lock the at least one data field among the set of data fields so that the at least one data field is not scanned on a subsequent scan.

14. The computer system of claim 8, further comprising program instructions to identify at least one data field among the set of data fields capable of being auto filled with one or more applications and displaying the one or more applications on the display screen.

15. A computer program product for interacting with a page within a real world scene, the computer program product comprising a computer readable storage device, and program instructions stored on the computer readable storage device, to:
- receive image data representing the page within the real world scene at an augmented reality device from an image capture unit, the image capture unit capturing the image data in a continuous capture mode in real time;
- perform a page scan of the captured image data representing the page;
- lock an area of the scanned data designated by the user;
- perform a subsequent page scan, the subsequent page scan scanning only areas of the page that are not locked;
- determine a set of data fields located on the page based on the page scan;
- receive context information for at least one data field among the set of data fields located on the page at the augmented reality device, the context information transforming the at least one data field into a control that the user can interact with; and
- incorporate augmented reality content into the page while viewing the page through a display screen of the augmented reality device in the continuous capture mode, wherein the augmented reality content is based on the context information.

16. The computer program product of claim 15, further comprising program instructions to cause the system to perform an interaction scan to determine a user interaction with the at least one data field among the set of data fields.

17. The computer program product of claim 16, further comprising program instructions to cause the system to receive a processing rule for the at least one data field among the set of data fields.

18. The computer program product of claim 17, further comprising program instructions to cause the system to incorporate page-level augmented reality content while viewing the page through the display screen, wherein the page-level augmented reality content includes at least one selectable button.

19. The computer program product of claim 18, further comprising program instructions to cause the system to incorporate feedback augmented reality content into the page while viewing the page through the display screen, wherein the additional augmented reality content is based on at least one of the user interaction, the processing rule, the at least one data field among the set of data fields, or a selection of the at least one selectable button.

20. The computer program product of claim 19, wherein the page scan and interaction scan are performed using optical character recognition.

* * * * *